(12) United States Patent
Morse et al.

(10) Patent No.: US 6,398,689 B1
(45) Date of Patent: Jun. 4, 2002

(54) ONE PIECE DIFFERENTIAL BEARING ADJUSTER LOCK AND FASTENER

(75) Inventors: David M. Morse, Waterford; Jill R. Gnass, Fowlerville; Joseph M. Endreszl, Westland, all of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/535,623

(22) Filed: Mar. 27, 2000

(51) Int. Cl.[7] .......................... F16H 48/06; F16C 23/00
(52) U.S. Cl. ....................................... 475/230; 384/583
(58) Field of Search ............................. 475/230, 346; 74/607; 384/583, 519

(56) References Cited

U.S. PATENT DOCUMENTS

| | | | |
|---|---|---|---|
| 1,339,991 A | * 5/1920 | Utz | 384/583 |
| 1,880,655 A | * 10/1932 | Baits | 384/583 |
| 2,133,112 A | * 10/1938 | Ormsby | 475/247 |
| 2,578,155 A | * 12/1951 | Slider | 475/246 |
| 2,651,216 A | * 9/1953 | Alden | 384/583 |
| 3,378,220 A | 4/1968 | Noll | |
| 4,489,464 A | 12/1984 | Massari et al. | |
| 4,592,576 A | 6/1986 | Proctor et al. | |
| 4,810,145 A | 3/1989 | Villas | |
| 5,324,151 A | 6/1994 | Szudarek et al. | |
| 5,673,777 A | 10/1997 | Ziech | |
| 5,697,677 A | * 12/1997 | Ruppert, Jr. et al. | 74/607 X |
| 5,829,107 A | 11/1998 | Wimmenauer et al. | |
| 5,906,465 A | 5/1999 | Sato et al. | |
| 6,024,666 A | * 2/2000 | Bunnow | 475/230 |
| 6,126,565 A | * 10/2000 | Irwin | 475/160 |
| 6,227,716 B1 | * 5/2001 | Irwin | 384/583 |

* cited by examiner

*Primary Examiner*—Charles A. Marmor
*Assistant Examiner*—Roger Pang
(74) *Attorney, Agent, or Firm*—Harness, Dickey & Pierce, P.L.C.

(57) ABSTRACT

A drive axle assembly for a motor vehicle includes an axle housing, a differential bearing, a differential assembly, an adjustment nut and an adjuster lock. The differential assembly is rotatably supported within the axle housing by the differential bearing. The differential bearing is coupled to the axle housing via a bearing cap having an aperture formed therein. The adjustment nut has at least one retention aperture and the adjustment nut is engaged with the differential bearing such that rotation of the adjustment nut axially displaces the differential bearing. The adjuster lock includes a first portion and a second portion. The first portion has a barb disposed in the bearing cap aperture. The second portion has a first lock pin disposed in the retention aperture thereby restricting the adjustment nut from rotating relative to the bearing cap.

11 Claims, 3 Drawing Sheets

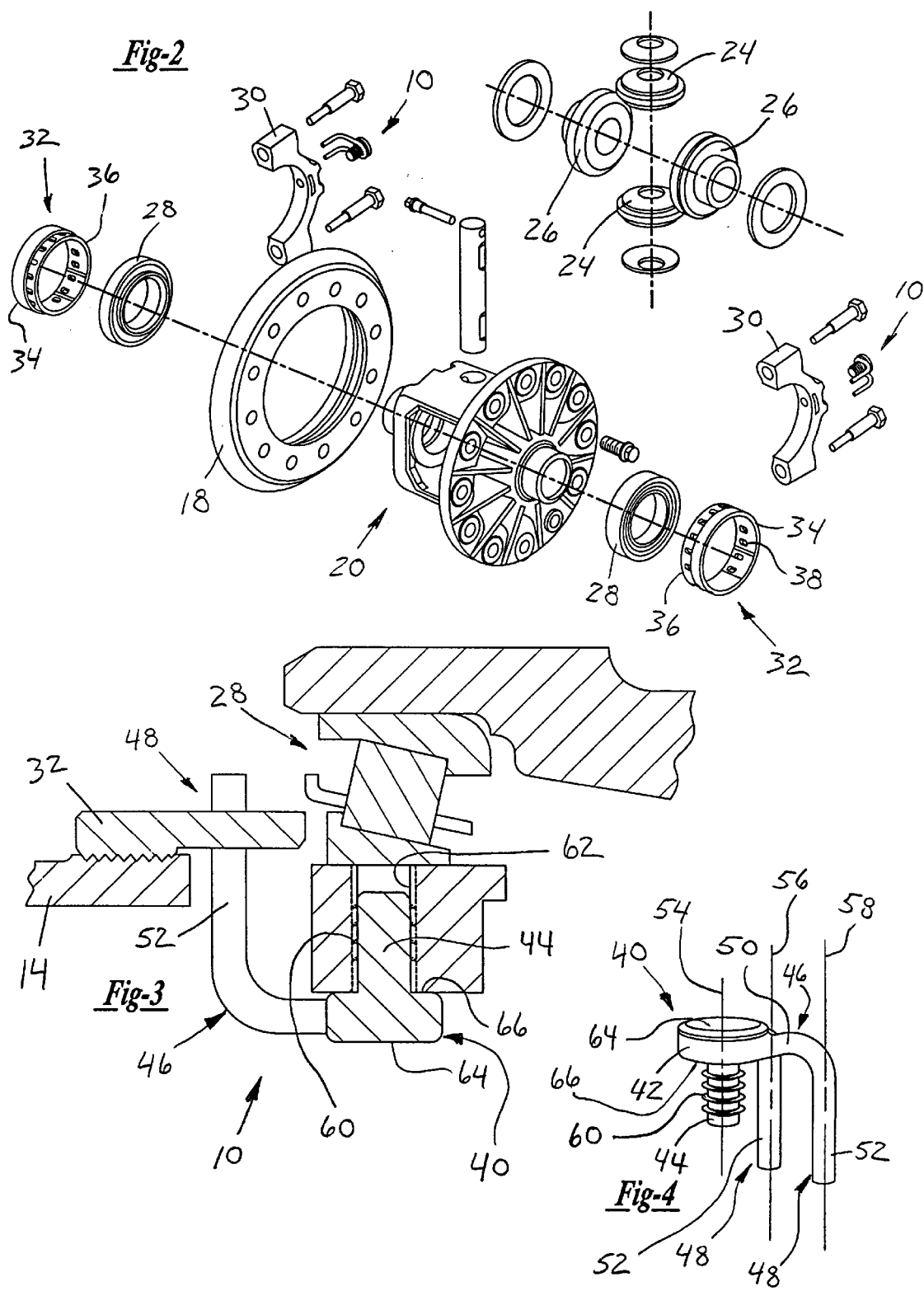

ONE PIECE DIFFERENTIAL BEARING ADJUSTER LOCK AND FASTENER

BACKGROUND OF THE INVENTION

1. Field of the Invention

The present invention relates generally to differentials for use in automotive drivelines and, more particularly, to a one piece differential bearing adjuster lock.

2. Discussion of the Related Art

Many of the differential assemblies used in automotive drive axles include a planetary gear set which is supported within a differential housing to facilitate relative rotation between a pair of output shafts. For example, in parallel-axis differentials, the gear set typically includes a pair of helical side gears that are splined to the ends of axle shafts and which are meshed with paired sets of helical pinions journalled in gear pockets formed in the differential housing. Since the gear pockets are parallel to the rotary axis of the differential housing, the pinions rotate on axes and are parallel to the common axis of the output shafts and the side gears. In response to speed differentiation between the output shafts, the torque transmitted through meshed engagement of the side gears and pinions generates thrust forces that are exerted by the gear components against the wall surface of the gear pockets and other thrust surfaces within the differential housing to frictionally limit such speed differentiation and proportion torque between the output shafts.

In addition, most automotive drive axles include a hypoid gear set for changing the direction of power transmission from an axis parallel to the direction of vehicle travel to an axis perpendicular thereto. The hypoid gear set includes a ring gear coupled to the differential housing and a pinion gear journally supported within the axle housing. To facilitate proper function of the drive axle assembly, the differential is mounted on a pair of slidable differential bearings. Typically, the differential bearings are positioned using an externally threaded hollow tube commonly referred to as a differential bearing adjustment nut.

The differential bearing adjustment nut is useful for setting both differential bearing preload and hypoid gear lash. The adjustment nut also provides a load surface for the differential bearing under normal operation. As such, this load surface realizes both axial and torsional loads imparted by the rotation of the differential housing. The axial loads are absorbed by the threaded interface of the adjustment nut with the machined axle housing. The torsional loads are resisted by a locking system that prevents the adjustment nut from rotating. Commonly, a two-piece locking system is utilized to couple the adjustment nut to the axle housing via a bearing cap.

Unfortunately, existing locking systems require an assembler to handle a wire form and a threaded fastener to perform this function. In addition, the assembler must subsequently start the thread in a tapped hole previously machined in the bearing cap and subsequently seat the threaded fastener within a given torque range. During assembly, this process often includes the steps of retrieving a pneumatic torque gun, aligning a socket with the bolt head and actuating the torque gun until the desired torque level has been reached. While the aforementioned process has been useful in retaining the adjustment nut from rotating during operation, it is costly due to the need to handle and install two separate components. Furthermore, the use, calibration, and maintenance of a torque gun is unavoidable. Consequently, there remains a need in the art for a one piece differential bearing adjuster lock and fastener capable of retaining differential bearing adjustment nuts without the use of torque applying tools.

SUMMARY OF THE INVENTION

The present invention provides a drive axle assembly for a motor vehicle including an axle housing, a differential bearing, a differential assembly, an adjustment nut and an adjuster lock. The differential assembly is rotatably supported within the axle housing by the differential bearing. The differential bearing is coupled to the axle housing via a bearing cap having an aperture formed therein. The adjustment nut has at least one retention aperture and is engaged with the differential bearing such that rotation of the adjustment nut axially displaces the differential bearing. The adjuster lock includes a first portion and a second portion. The first portion has a barb disposed in the bearing cap aperture. The second portion has a first lock pin disposed in the retention aperture thereby restricting the adjustment nut from rotating relative to the bearing cap.

Further objects, features and advantages of the invention will become apparent from a consideration of the following description and the appended claims when taken in connection with the accompanying drawings.

BRIEF DESCRIPTION OF THE DRAWINGS

FIG. 2 is a partial, enlarged, view of the exemplary axle assembly of FIG. 1;

FIG. 3 is a cross sectional view of a portion of the axle assembly of FIG. 1; and FIG. 4 is a perspective view of the one piece differential bearing adjuster lock and fastener of the present invention.

DETAILED DESCRIPTION OF THE PREFERRED EMBODIMENT

Figure 1:
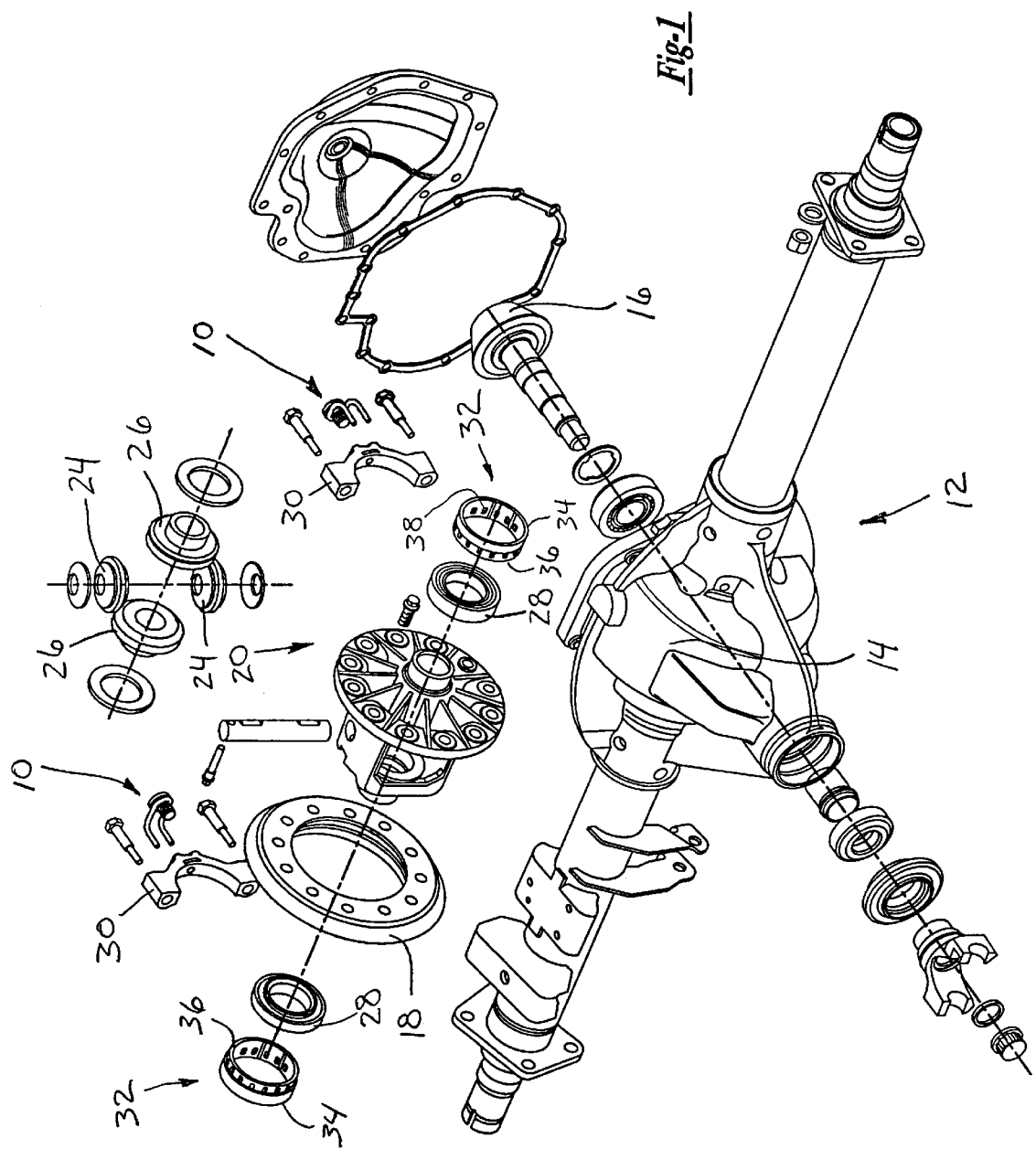
FIG. 1 is an exploded perspective view of an exemplary axle assembly equipped with the one piece differential bearing adjuster lock and fastener of the present invention.

With reference to the drawings, a one piece differential bearing adjuster lock and fastener constructed in accordance with the teachings of an embodiment of the present invention is generally identified at reference numeral 10. The adjuster lock is shown operatively associated with an exemplary drive axle assembly 12.

As particularly shown in FIG. 1, the drive axle assembly 12 is illustrated to generally include an axle housing 14 for rotatably mounting a hypoid gear set including a pinion gear 16 and a ring gear 18 drivingly interconnected to a differential assembly 20. The differential assembly 20 functions to transfer power to a pair of axle shafts (not shown) while compensating for any difference in axle shaft speed rotation as may occur during a turn or other steering maneuver. In order to compensate for a differential in axle shaft rotational speed, the differential assembly 20 includes a pair of pinion gears 24 and a pair of side gears 26 drivingly interconnected to the axle shafts. To facilitate proper function of the axle assembly 12, the differential assembly 20 is rotatably mounted on a pair of differential bearings 28. More particularly, the axle housing 14 includes two semi-circular journals (not shown) for supporting approximately 180 degrees of the circumference of each of the differential bearings 28. A pair of bearing caps 30 journally support the remaining approximate one-half of each of the differential bearings 28. Each bearing cap 30 is mounted to the axle housing 14 in a manner conventional in the art such as via threaded fasteners.

To assure optimum differential bearing life and proper pinion gear to ring gear engagement, a pair of adjustment nuts 32 are provided. As shown in FIG. 2, each adjustment nut 32 has a first end 34 threadingly engaged with the axle housing 14 and a second end 36 abuttingly engaged with the differential bearing 28 such that rotation of the adjustment nut 32 axially displaces the differential bearing 28. Each adjustment nut 32 further includes a plurality of retention apertures or slots 38 for receipt of a portion of the adjuster lock 10.

Figure 1A:
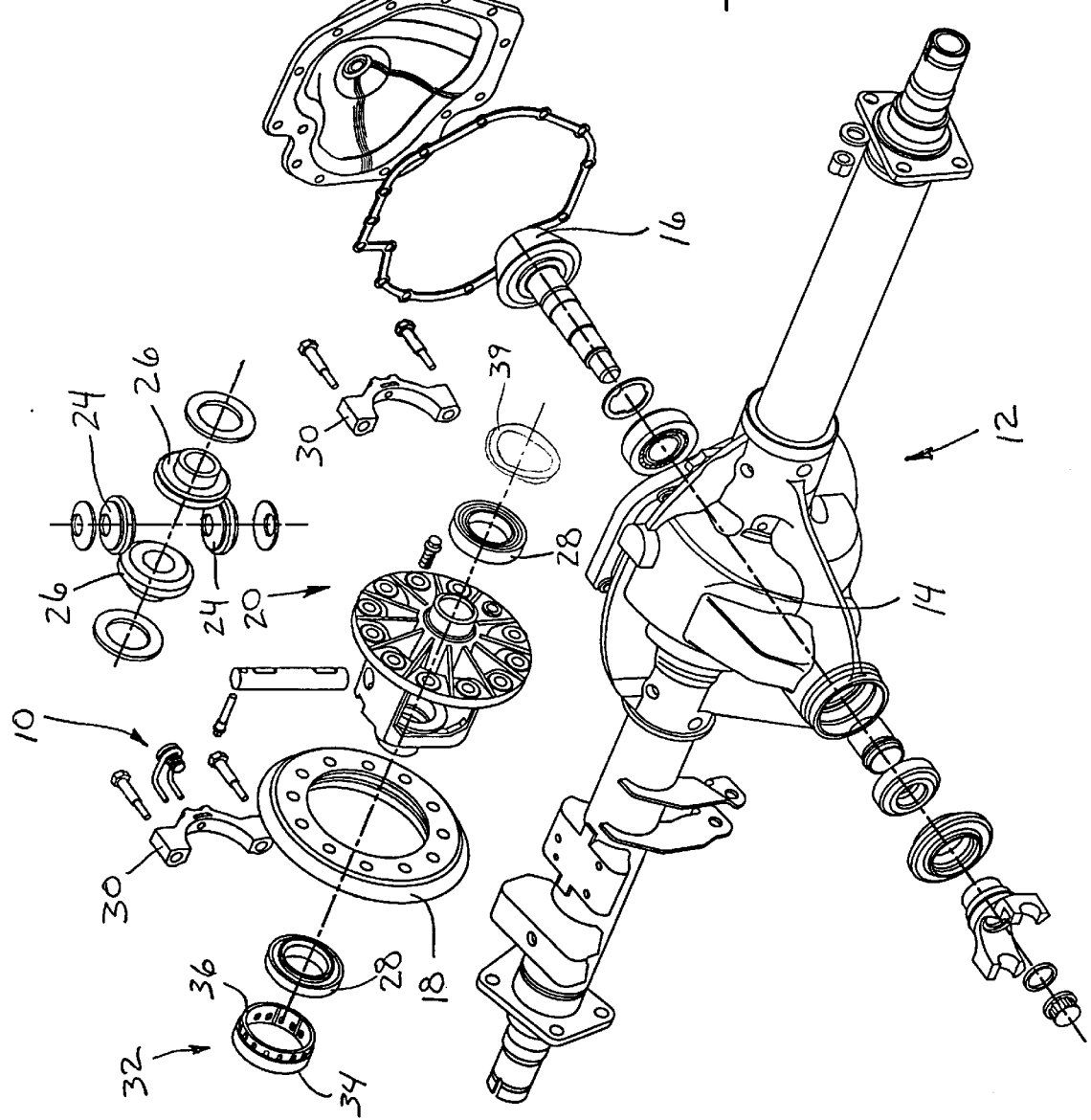
FIG. 1A is an exploded perspective view of a second embodiment of an exemplary axle assembly including the one-piece differential bearing adjuster lock and fastener of the present invention.

As shown in FIG. 1A, a second embodiment of the axle assembly 12 includes a shim 39 in place of one of the adjustment nuts 32. The shim 39 functions to set a gear backlash or position relative to the pinion gear 16. The single adjustment nut 32 is utilized for adjusting bearing preload. One skilled in the art should appreciate that the adjuster lock 10 may be utilized with either of the axle assembly embodiments previously described without departing from the scope of the present invention.

Referring to FIGS. 2 and 3, the adjuster lock 10 functions to interconnect the adjustment nut 32 and the bearing cap 30 to prevent relative rotation therebetween. Preferably, the plurality of slots 38 are axially elongated to assure receipt of a portion of the adjuster lock 10 regardless of the amount of adjustment required to properly set the gear engagement or lash and the differential bearing preload. One skilled in the art will appreciate that other geometrical shapes such as oversized cylinders may be utilized in place of slots 38 without departing from the scope of the present invention.

In reference to FIG. 4, the adjuster lock 10 includes a first portion 40 having a head 42 and a body 44 integrally formed with a second or locking portion 46. The second portion 46 includes a pair of locking pins 48 each having a radially extending section 50 and a downwardly extending section 52. Preferably, both first portion 40 and second portion 46 of adjuster lock 10 are constructed from a composite material. It should be appreciated that the body 44 defines a first axis 54 positioned substantially parallel to a second axis 56 and a third axis 58 defined by the downwardly extending sections 52. The first portion 40 further includes a plurality of barbs 60 circumferentially positioned about the length of the body 44. Each of the barbs 60 are shaped to accommodate deflection in a direction toward the head 42 and resist deflection in the opposite direction. Accordingly, once the first portion 40 is inserted within an appropriately sized receptacle, such as a bearing cap aperture 62 (FIG. 3), barbs 60 resist withdrawal of the body 44 from the receptacle.

In addition, the head 42 of the first portion 40 includes a top surface 64 and a bottom surface 66 for simplified installation of the adjuster lock 10 of the present invention. Specifically, once the adjustment nuts 32 have been rotated to set the gear lash and the differential bearing preload, the locking pins 48 of the adjuster lock 10 are disposed within two of the slots 38. To continue installation of the adjuster lock 10, an operator depresses the top surface 64 of the head 42 to engage the barbs 60 with the bearing cap aperture 62. Axial displacement of the adjuster lock 10 continues until the bottom surface 66 of head 42 contacts the bearing cap 30.

At this time, assembly is complete and the one piece differential bearing lock and fastener 10 interconnects the adjustment nut 32 and the bearing cap 30 thereby preventing variation in gear lash and differential bearing preload over time. One skilled in the art will appreciate that the bearing cap aperture 62 need not include an internal thread for engagement with the barb 60 but the presence of an existing thread will not compromise proper operation of the adjuster lock 10. It should further be appreciated that while the preferred embodiment of the adjuster lock 10 includes two locking pins 48, only one pin or protrusion is required to prevent the adjustment nut 32 from rotating after final assembly.

Accordingly, the adjuster lock 10 of the present invention provides both manufacturing and functional advantages. Specifically, the adjuster lock 10 of the present invention reduces the number of components required to couple the adjustment nut to the bearing cap. In addition, assembly cost is reduced by eliminating the need for starting a threaded fastener and subsequently applying torque to the fastener with a calibrated tool.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A drive axle assembly for a motor vehicle comprising:

an axle housing;

a differential bearing;

a differential assembly rotatably supported within said axle housing by said differential bearing, said differential bearing coupled to said axle housing via a bearing cap, said bearing cap having an aperture formed therein;

an adjustment nut having at least one retention aperture, said adjustment nut engaged with said differential bearing such that rotation of said adjustment nut axially displaces said differential bearing; and an adjuster lock including a first portion and a second portion, said first portion having a barb disposed in said bearing cap aperture, said second portion having a first lock pin disposed in said retention aperture thereby restricting said adjustment nut from rotating relative to said bearing cap, wherein said second portion of said adjuster lock includes a second lock pin engaging said adjustment nut, said second lock pin spaced apart from said first lock pin.

2. The drive axle assembly of claim 1 wherein said first portion includes a generally cylindrical body having an outwardly extending barb portion for engaging said bearing cap aperture.

3. The drive axle assembly of claim 2 wherein said adjuster lock is coupled to said bearing cap by axially disposing said first portion within said bearing cap aperture without relative rotation therebetween.

4. The drive axle assembly of claim 3 wherein said adjuster lock is constructed from a composite material.

5. A differential bearing adjuster lock for a driveline having a housing and a differential assembly rotatably supported within the housing by a differential bearing, the differential bearing coupled to the housing via a bearing cap having an aperture and positionable relative to the housing by rotating an adjustment nut, the adjuster lock comprising:

a first portion having a body and a head, said body having a plurality of barbs extending outwardly therefrom, said barbs adapted for engaging the bearing cap; and a second portion having first and second spaced apart locking pins adapted for engaging said adjustment nut to prevent relative rotation between the adjustment nut and the bearing cap.

6. The differential bearing adjuster lock of claim 5 wherein said first locking pin and said body are generally cylindrical in shape, said body defining a first axis and said first locking pin defining a second axis substantially parallel to said first axis.

7. The differential bearing adjuster lock of claim 6 wherein said barbs are adapted for engaging the bearing cap without relative rotation therebetween.

8. The differential bearing adjuster lock of claim 7 wherein said plurality of barbs are adapted for elastic deformation upon entry into the bearing cap aperture.

9. The differential bearing adjuster lock of claim 5 wherein said fastener and said first locking pin are constructed from a composite material.

10. The differential bearing adjuster lock of claim 5 wherein said body is adapted to be disposed within the aperture and said head limits the displacement of said body within the aperture.

11. The differential bearing adjuster lock of claim 10 wherein said first locking pin is adapted for preventing rotation of the adjustment nut.

\* \* \* \* \*